United States Patent [19]

Howard et al.

[11] Patent Number: 4,913,986

[45] Date of Patent: Apr. 3, 1990

[54] BATTERY FILL-POST SEAL ARRANGEMENT FOR HERMETICITY LEAKAGE TESTING

[75] Inventors: William G. Howard, St. Paul; David R. Berberick, Maple Grove, both of Minn.

[73] Assignee: Medtronic, Inc., Minneapolis, Minn.

[21] Appl. No.: 859,925

[22] Filed: May 5, 1986

Related U.S. Application Data

[63] Continuation of Ser. No. 537,256, Sep. 28, 1983, abandoned.

[51] Int. Cl.[4] .............................................. H01M 10/48
[52] U.S. Cl. ....................................... 429/90; 429/174; 429/185; 73/40.7; 73/52
[58] Field of Search ................. 429/90, 185, 171, 174, 429/122, 121; 73/40.7, 49.3, 49.8, 52; 220/361, 365, 378; 277/2

[56] References Cited

U.S. PATENT DOCUMENTS

| | | | |
|---|---|---|---|
| 4,174,424 | 11/1979 | Jurva et al. | 429/90 |
| 4,565,093 | 1/1986 | Jurva et al. | 429/90 X |
| 4,748,094 | 5/1988 | Howard et al. | 429/90 |

Primary Examiner—Anthony Skapars
Attorney, Agent, or Firm—Vidas & Arrett

[57] ABSTRACT

Double seal arrangement with intermediate test gas holding means for leak testing and assuring high hermetic batteries.

3 Claims, 1 Drawing Sheet

BATTERY FILL-POST SEAL ARRANGEMENT FOR HERMETICITY LEAKAGE TESTING

This is a continuation of application Ser. No. 537,256, filed Sept. 28, 1983, now abandoned.

BACKGROUND

This invention is concerned with assuring the hermetic sealing of high reliability batteries such as those used for military purposes or medical purposes. Such batteries are generally relatively small and of high energy density. The contents of such batteries typically may consist of high energy corrosive materials such as lithium anodes, carbon current collectors and liquid thionyl chloride cathode/electrolytes and the like. Other such batteries may include lithium anodes, organic solvent electrolytes such as propylene carbonate containing a dissolved salt such as lithium perchlorate for enhanced conductivity and solid cathode materials such as manganese dioxide, vanadium pentoxide or carbon monofluoride. Another such battery is one having a cathode depolarizer material such as an organic-iodine charge transfer complex compound.

Such batteries are usually encapsulated in a metal container having a fill port. Stainless steel is the metal most commonly used. Following placement of mechanical parts and any solid chemical constituents in the container, the container is then filled with any liquid or liquid-like battery constituents, such as fluid cathode/electrolytes in teh case of thionyl chloride batteries or molten charge transfer complex in the case of the iodine batteries, by pouring same into the battery through the fill port. The fill-port is then sealed.

The hermeticity or perfection of seal at the fill port is an important feature in high reliability cells. It is also important that the seal be amenable to testing in order to ascertain and demonstrate that a high degree of hermeticity has been achieved.

SUMMARY OF THE INVENTION

This objective as well as others, which will become apparent hereinbelow as the description proceeds, is achieved by providing in accordance with this invention a double seal arrangement comprised of inner and outer seals about the filling port with an intermediate chamber between the seals containing a means for holding a test gas used in testing the outer seal for hermeticity. This arrangement facilitates the hermetic testing of the outer seal thereby providing a basis for a high degree of confidence in it.

DESCRIPTION OF THE PREFERRED EMBODIMENT

Figure 1:
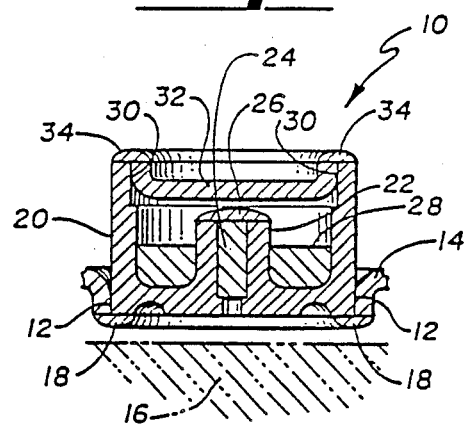
FIG. 1 is a schematic drawing of a battery showing an embodiment of the fill-port sealing arrangement of the invention.

Shown in FIG. 1 is one seal arrangement, generally indicated at 10, according to the invention which is welded or otherwise hermetically sealed into an annular opening 12 of the cell wall 14 of a battery generally indicated at 16. Annular weld 18 provides a highly reliable means of sealing the arrangement of the invention into the battery to form a fill-opening which can be reliably sealed and hermetically tested as is described hereinbelow. Preferably, welding is accomplished by means of plasma, TIG, laser or resistance welding.

The seal arrangement according to this embodiment of the invention takes the form of a one-piece, annular metal housing 20 having a cup-like shape and incorporating an interiorly located upstanding conduit 22 through which the liquid battery contents may be poured into the battery. Preferably, housing 20 is of stainless steel. A metal plug 24 may be inserted into tube 22 to facilitate the formation of a weld 26 on its top thereby forming an inner seal for the battery.

Although welding is the preferred means of inner seal formation in this embodiment, any other suitable means may be used as well, such as pinch sealing, crimp sealing or swage sealing and the like so long as the technique used affords a high degree of confidence that a substantial seal will result. This inner seal need not be highly hermetic. Only the outer seal must be reliably hermetic.

Following the sealing of inner conduit 22, a helium-holding material 28 or other test gas sorbing material is placed within housing 20. As will be pointed out hereinbelow, this material may take various forms. Glass beads such as those obtained from 3M Co. and described in more detail below are preferred. Graphite such as type No. 901 obtained from Superior Graphite Company, 20 North Wacker Drive, Chicago, Ill. 60606 may also be used.

After placement of the test gas-holding material 28, the top opening 30 of housing 20 is hermetically sealed by placement of a metal cap 32 which is welded into place by means of a weld 34.

The object of the formation of this outer seal opening closure at the top of housing 20 is to provide a hermetic seal which can be tested for hermeticity. This is accomplished as follows. The sealed battery is placed inside a container and subjected to pressurized helium or other test gas, the pressure being on the order of 60 psi in the case of helium for a period of time such as one hour. Under such pressure, even perfectly reliable hermetic seals will allow the passage of some helium or other test gas into the interior of housing 20 where it is sorbed and held by test gas-holding material 28. Upon removal from the pressurized environment, the battery is tested by means of a vacuum mass spectrometer or other suitable apparatus which draws a vacuum on the container and provides an indication of the amount of test gas removed therefrom. By measuring the amount of test gas drawn from the holding material in the chamber of housing 20 and through the outer seal, a determination of the rate of loss of test gas can be made and directly correlated to the hermeticity of the seal.

Figure 2:
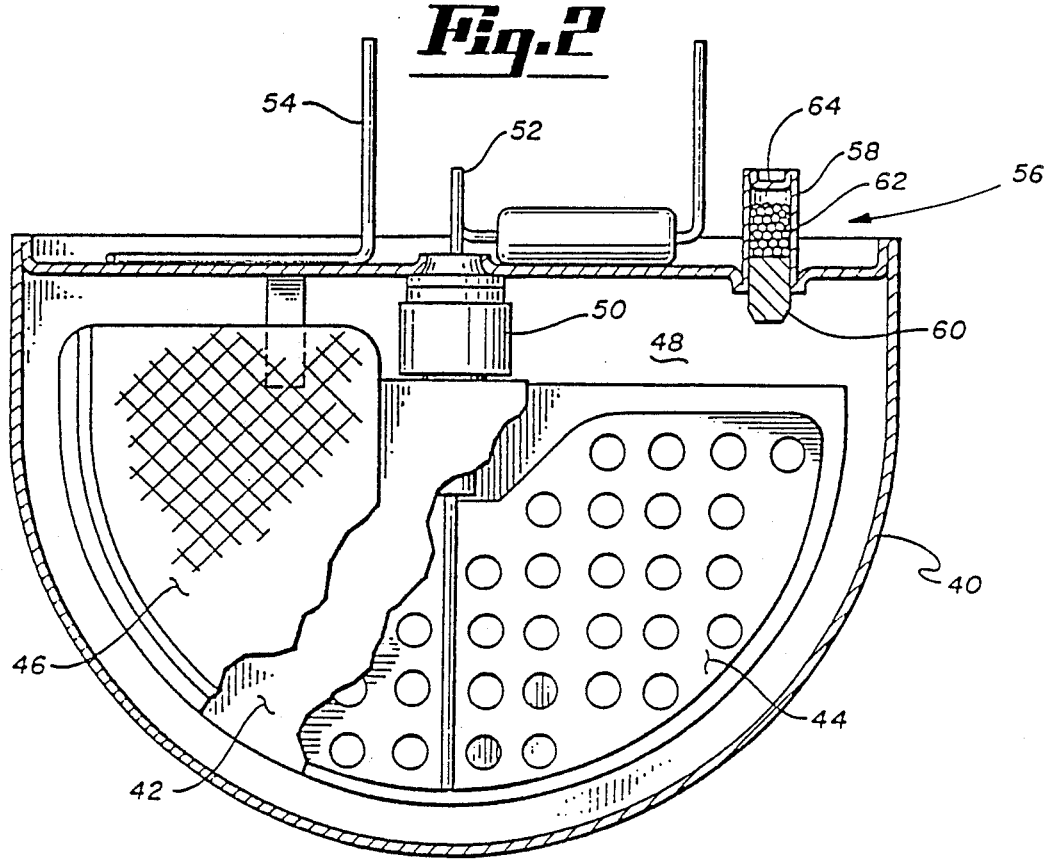
FIG. 2 is a showing of a most preferred seal embodiment of the invention in an actual battery.

Referring now to FIG. 2, a battery is shown which includes a seal arrangement of the invention in its most preferred embodiment. The battery includes a metal, preferably stainless steel, container 40 which holds in addition to an anode 42, such as lithium, having an interior current collector 44, a cathode current collector 46 which in the case of a thionyl chloride battery for example is a high surface area carbon current collector and an electrolyte or cathode/electrolyte component such as liquid thionyl chloride 48 as is known in the art. As indicated above, other types of batteries, internal mechanical arrangements and chemical constituents may be utilized. The specific ones described here are merely for illustration. The battery will also include appropriate electrical feedthroughs such as at 50 and electrical leads 52 and 54.

The battery also includes an access or fill port or opening generally indicated at 56 which must be hermetically sealed and to which this invention is specifically directed.

In hermetically sealing opening 56 and for the purposes of facilitating leakage testing, a metal sleeve 58, preferably stainless steel, is welded in opening 56. An inner plug 60, preferably of polytetrafluorethylene or the like, is press-fitted or interference-fitted into the opening as shown. It is not necessary that the seal formed by plug 60 be hermetic but that it provide substantial sealing so as to prevent leakage of battery contents. A leak rate of 10-3 standard cubic centimeters per second of helium or something on that order is adequate for the inner seal.

A quantity of test gas holding material 62 is then placed in sleeve 50 but it is not filled to the top as a slight space should be left between the top and material 62. It is preferred that material 62 be a good sorber of helium, the preferred test gas. However, other gas sorber materials for sorbing other test gases such as hydrogen, freon or radioactive krypton may be used. Alternatively, the gas sorber 62 may be incorporated in the plug 60 as a filler in the polymer plug proper.

The most preferred sorber material 62 consists of hollow glass bubbles available from the 3M Company of St. Paul, Minn. 55101. The bubbles are hollow and absorb the test gas, holding it inside the bubbles for later leakage testing procedures in which the test gas is withdrawn at least partially. Several types of glass bubbles are available from 3M Company. Generally, they vary in size over the range of 20–130 microns and are very small, smaller than the size of a grain of salt. They are usually referred to as microspheres. Of the various types available, types A38/4000 and D32/4500 are most preferred. They are generally marked as "3M brand glass bubbles".

Other sorber materials which are absorbers, adsorbers or both may also be used. For example, graphite which is primarily an absorber may be used. High surface area carbon black which is primarily an adsorber may be used. Molecular sieves which both absorb and adsorb may be used. Mullite ($3Al_2O_3 \cdot 2SiO_2$) or Alumina ($Al_2O_3$) which are both an absorber and adsorber may be used. Closed cell polymer foams such as polystyrene or polyurethane may be used.

Following placement of the gas holding material or sorber, the top of sleeve 58 is closed by welding a metal cap 64 in place.

The battery is then ready for hermetically testing as previously described.

The double seal arrangement with intermediate test gas holding means as described above has been found to produce very good results insofar as reliable hermeticity testing is concerned.

Having described the invention by way of illustration, the exclusive property rights therein are defined by the following claims.

What is claimed is:

1. An inner and outer seal arrangement for facilitating the leak testing of hermetically sealed fill openings in battery containers, comprising:
   a fill opening in the battery container through which battery contents may be inserted and for receiving the seal arrangement which comprises;
   upstanding housing means forming a chamber about the opening, the housing having an open top;
   inner seal means closing the battery interior and its contents off from the container opening and the housing chamber, the seal means consisting of a plastic plug press-fit into the container opening;
   outer hermetic seal means spaced from the inner seal means and hermetically closing the open top of the housing and consisting of a metal cap welded to the housing, and
   test gas holding means comprising graphite in the housing chamber between the inner and outer seals.

2. An inner and outer seal arrangement for facilitating the leak testing of hermetically sealed fill openings in battery containers, comprising:
   a fill opening in the battery container through which battery contents may be inserted and for receiving the seal arrangement which comprises;
   upstanding housing means forming a chamber about the opening, the housing being an annular one-piece cup-shaped component formed of metal with an open top;
   inner seal means closing the battery interior and its contents off from the container opening and the housing chamber, the inner seal means comprising an inner upstanding conduit at the bottom of the upstanding housing and in communication with the container opening, the conduit being shorter than the overall height of the cup-shaped housing and having an open top sealed by means of a metal plug;
   outer hermetic seal means spaced from the inner seal means and hermetically closing the open top of the housing and consisting of a metal cap welded to the housing, and
   test gas holding means comprising graphite in the housing chamber between the inner and outer seals.

3. An inner and outer seal arrangement for facilitating the leak testing of hermetically sealed fill openings in battery containers, comprising:
   a fill opening in the battery container through which battery contents may be inserted and for receiving the seal arrangement which comprises:
   upstanding housing means forming a chamber about the opening, the housing having an open top;
   inner seal means closing the battery interior and its contents off from the container opening and the housing chamber, the seal means consisting of a plastic plug press-fit into the container opening;
   outer hermetic seal means spaced from the inner seal means and hermetically closing the open top of the housing and consisting of a metal cap welded to the housing, and
   test gas holding means comprising glass bubbles in the housing chamber between the inner and outer seals.

* * * * *

UNITED STATES PATENT AND TRADEMARK OFFICE
CERTIFICATE OF CORRECTION

PATENT NO. : 4,913,986

DATED : April 3, 1990

INVENTOR(S) : W. Howard et al

It is certified that error appears in the above-identified patent and that said Letters Patent is hereby corrected as shown below:

ON THE TITLE PAGE:

IN THE TITLE: Delete "POST" and insert - PORT -

Col. 1, line 31, delete "teh" and insert - the -

Col. 3, line 18, delete "50" and insert - 58 -

Signed and Sealed this

Third Day of December, 1991

Attest:

HARRY F. MANBECK, JR.

Attesting Officer

Commissioner of Patents and Trademarks